United States Patent [19]

St. Clair

[11] Patent Number: 6,043,316
[45] Date of Patent: Mar. 28, 2000

[54] CROSSLINKABLE HYDROXY TERMINATED POLYDIENE POLYMER COATING COMPOSITIONS FOR USE ON SUBSTRATES AND A PROCESS FOR PREPARING THEM

[75] Inventor: David John St. Clair, Houston, Tex.

[73] Assignee: Shell Oil Company, Houston, Tex.

[21] Appl. No.: 09/005,238

[22] Filed: Jan. 9, 1998

Related U.S. Application Data

[62] Division of application No. 08/748,291, Nov. 13, 1996, Pat. No. 5,750,627
[60] Provisional application No. 60/006,816, Nov. 16, 1995, and provisional application No. 60/028,378, Oct. 15, 1996.

[51] Int. Cl.[7] ........................................................ C08F 8/32
[52] U.S. Cl. .......................... 525/162; 525/381; 525/382
[58] Field of Search ................................... 525/162, 381, 525/382

[56] References Cited

U.S. PATENT DOCUMENTS

| | | | |
|---|---|---|---|
| 4,237,245 | 12/1980 | Halasa et al. | 525/272 |
| 5,115,019 | 5/1992 | Marx et al. | 525/65 |
| 5,149,895 | 9/1992 | Coolbaugh et al. | 526/173 |
| 5,169,910 | 12/1992 | Corley | 525/481 |
| 5,191,024 | 3/1993 | Shibata et al. | 525/314 |
| 5,210,359 | 5/1993 | Coolbaugh et al. | 526/173 |
| 5,229,464 | 7/1993 | Erickson et al. | 525/314 |
| 5,247,026 | 9/1993 | Erickson et al. | 525/331.9 |
| 5,332,783 | 7/1994 | Dillman et al. | 525/92 |
| 5,500,481 | 3/1996 | St. Clair | 525/92 K |

FOREIGN PATENT DOCUMENTS

| | | |
|---|---|---|
| 0396780 A1 | 11/1989 | European Pat. Off. . |
| 0441485 A2 | 1/1991 | European Pat. Off. . |
| 0698638 | 7/1995 | European Pat. Off. . |
| 62-178718 | 7/1987 | Japan . |
| 2-275256 | 10/1990 | Japan . |
| 2-409745 | 12/1990 | Japan . |
| 2270317 | 8/1993 | United Kingdom . |

*Primary Examiner*—Bernard Lipman
*Attorney, Agent, or Firm*—Donald F. Haas

[57] ABSTRACT

A crosslinkable composition for coating primed and unprimed substrates comprising from 10 to 80 percent by weight of a hydroxy functional polydiene polymer having a functionality of at least 1.3, 8 to 60 percent by weight of an amino resin crosslinking agent, and 2 to 40 percent by weight of a reinforcing agent. The invention also encompasses a process to make such compositions by partially reacting the three components for 0.5 to 10 hours at 60 to 120° C., optionally in the presence of a small amount of catalyst, to give phase stable compositions and subsequently completely crosslinking the composition by baking the composition on a substrate. The invention also encompasses a process for painting a substrate which comprises priming the substrate with a primer selected from the group consisting of epoxy resin primers and polyester resin primers, applying to the primed substrate a crosslinkable basecoat composition comprising from 10 to 80 percent by weight of a hydroxy functional polydiene polymer having a functionality of at least 1.3, from 8 to 60 percent by weight of an amino resin crosslinking agent, and from 2 to 40 percent by weight of a reinforcing agent, and applying over the basecoat a clearcoat selected from the group consisting of dihydroxy polydiene-based clearcoats, polyester clearcoats, and acrylic clearcoats.

4 Claims, No Drawings

CROSSLINKABLE HYDROXY TERMINATED POLYDIENE POLYMER COATING COMPOSITIONS FOR USE ON SUBSTRATES AND A PROCESS FOR PREPARING THEM

CROSSREFERENCE TO PRIOR APPLICATION

This application claims priority to provisional U.S. patent applications Ser. No. 60/006,816, filed Nov. 16, 1995, and Ser. No. 60/028,378, filed Oct. 15, 1996.

This is a division of application Ser. No. 08/748,291 now U.S. Pat. No. 5,750,629, filed Nov. 13, 1996, the entire disclosure of which is hereby incorporated by reference.

FIELD OF THE INVENTION

This invention relates to novel crosslinkable compositions comprised of hydroxy terminated polydiene polymers, amino resins, and reinforcing agents. More specifically, the invention relates to the use of particular di- and polyhydroxy terminated hydrogenated diene polymers in crosslinking with amino resins to produce products which are useful in coating compositions which adhere well to substrates which have or have not been coated with a suitable primer. These coating compositions may contain pigment and may be used to "paint" the substrate.

BACKGROUND OF THE INVENTION

Hydroxy functional polydiene polymers are well known. U.S. Pat. No. 5,393,843 discloses that formulations containing these polymers, a melamine resin, and an acid catalyst can be cured by baking under normal bake conditions. This same patent also discloses that these polymers can be mixed with isocyanates to yield compositions which cure at ambient temperature. However, these compositions based on hydroxy functional polydiene polymers cured with a crosslinking agent are usually fairly soft and, although they can be very useful in some applications, they have limited adhesion. Attempts to increase hardness and adhesion by increasing crosslink density by simply mixing these components with a reinforcing agent, such as a low molecular weight diol or triol, and higher levels of crosslinking agent were unsuccessful because the reinforcers and crosslinkers are relatively polar and so are incompatible with the relatively nonpolar polydiene polymers. Incompatibility of the components leads to poor properties, such as gloss, in the cured composition or, even worse, the compositions may phase separate upon storage prior to cure.

One potential use for these compositions is for direct application to an acceptable substrate such as a plastic automotive exterior part. They are also highly useful in coatings for use on substrates which have already been coated with a primer coating. An example of this type of application is in basecoat coatings (basecoats) in the automotive industry. The basecoat contains pigment and is the actual "paint" which goes onto the car. A clear coat is usually applied over the basecoat to preserve the color. One primary substrate to which the basecoats will be applied is steel which has been primed with an epoxy resin based primer which was applied by the cathodic electrodeposition (CED) process. Another substrate which could be used is the epoxy primed steel which has also been coated with a primer/surfacer which is usually based on a polyester resin.

This invention presents novel compatible coating compositions prepared from these components which exhibit excellent adhesion to primed and unprimed substrates and provides a process for the preparation of these novel compositions. This invention thus provides a composition which may be used to "paint" the entire exterior of an automobile.

SUMMARY OF THE INVENTION

The invention herein is a coating composition which is highly useful for coating and painting a variety of unprimed substrates, such as plastic surfaces including polyethylene, polypropylene, etc., and for painting primed substrates. Steel is the most common substrate which requires priming and it is usually primed as described above. The coating composition of this invention is a crosslinkable composition containing a hydroxy functional polydiene polymer, an amino resin crosslinking agent, and a reinforcing agent which has at least two functional groups which will react with the amino resin crosslinker. The coatings of this invention will usually contain a pigment but it is not required. The preferred polymers for use herein are hydrogenated polydiene diols. The polymers must have a functionality of at least about 1.3 so that they will actually crosslink. In a more preferred embodiment of the invention, the diol will have a functionality of at least about 1.9. In another preferred embodiment of the invention, the diene polymer will contain a substantial amount of a vinyl aromatic hydrocarbon, usually styrene, since coatings made from such polymers exhibit good adhesion to unprimed steel substrates as well.

In order to make the compositions of the present invention, the novel process of this invention must be followed. The diene polymer, the amino resin, and the reinforcing agent are mutually incompatible and therefore cannot be used as merely a physical blend. Instead, they must be partially reacted before they are cast as a film or otherwise used instead of being used as a blend which is crosslinked after application. The components should be "cooked" in a vessel for some combination of time, temperature, and catalyst concentration sufficient to give a composition which will not phase separate. Typical cooking conditions are 0.5 to 10 hours, preferably 1 to 4 hours, at 60 to 120° C., preferably 80 to 100° C., with about 0 to 0.4 parts by weight of a catalyst which is used to accelerate the reaction of the hydroxyls with the amino resin. Complete crosslinking of the composition is accomplished after the catalyst concentration is increased to the requisite level and the composition is applied to the substrate and baked.

DETAILED DESCRIPTION OF THE INVENTION

Hydroxy functional polydiene polymers and other polymers containing ethylenic unsaturation can be prepared by copolymerizing one or more olefins, particularly diolefins, by themselves or with one or more alkenyl aromatic hydrocarbon monomers. The copolymers may, of course, be random, tapered, block or a combination of these, as well as linear, radial or star.

The hydroxy functional polydiene polymers may be prepared using anionic initiators or polymerization catalysts. Such polymers may be prepared using bulk, solution or emulsion techniques. When polymerized to high molecular weight, the polymer will, generally, be recovered as a solid such as a crumb, a powder, a pellet or the like. When polymerized to low molecular weight, it may be recovered as a liquid such as in the present invention.

In general, when solution anionic techniques are used, copolymers of conjugated diolefins, optionally with vinyl aromatic hydrocarbons, are prepared by contacting the monomer or monomers to be polymerized simultaneously or sequentially with an anionic polymerization initiator such as group IA metals, their alkyls, amides, silanolates, naphthalides, biphenyls or anthracenyl derivatives. It is preferred to use an organo alkali metal (such as sodium or potassium) compound in a suitable solvent at a temperature within the range from about −150° C. to about 300° C., preferably at a temperature within the range from about 0° C. to about 100° C. Particularly effective anionic polymerization initiators are organo lithium compounds having the general formula:

$$RLi_n$$

wherein R is an aliphatic, cycloaliphatic, aromatic or alkyl-substituted aromatic hydrocarbon radical having from 1 to about 20 carbon atoms and n is an integer of 1 to 4.

Conjugated diolefins which may be polymerized anionically include those conjugated diolefins containing from about 4 to about 24 carbon atoms such as 1,3-butadiene, isoprene, piperylene, methylpentadiene, phenyl-butadiene, 3,4-dimethyl-1,3-hexadiene, 4,5-diethyl-1,3-octadiene and the like. Isoprene and butadiene are the preferred conjugated diene monomers for use in the present invention because of their low cost and ready availability. Alkenyl (vinyl) aromatic hydrocarbons which may be copolymerized include vinyl aryl compounds such as styrene, various alkyl-substituted styrenes, alkoxy-substituted styrenes, vinyl naphthalene, alkyl-substituted vinyl naphthalenes and the like.

The hydroxy terminated polymers of this invention are generally diols when the polymer is linear. Radial and star polymers are also contemplated herein and in such case, the polymers would be polyols wherein a hydroxy group is located at the ends of most or all of the arms of such polymers.

The hydroxy functional polydiene polymers may have number average molecular weights of from about 500 to about 500,000. Lower molecular weights require excessive crosslinking whereas higher molecular weights cause very high viscosity, making processing very difficult. More preferably, the polymer is one having a number average molecular weight of from about 1,000 to about 50,000. Most preferably, the polymer is a predominately linear diol having a number average molecular weight of from about 2,000 to about 20,000 because this offers the best balance between cost, ability to use the mildest curing conditions, and achieving good processing behavior.

Hydrogenated polybutadiene diols are preferred for use herein because they are easily prepared, they have low glass transition temperature, and they have excellent weatherability. The diols, dihydroxylated polybutadienes, are synthesized by anionic polymerization of conjugated diene hydrocarbon monomers with lithium initiators. Polyols can be synthesized in the same manner. This process is well known as described in U.S. Pat. Nos. 4,039,593 and Re. 27,145 which descriptions are incorporated herein by reference. Polymerization commences with a monolithium, dilithium, or polylithium initiator which builds a living polymer backbone at each lithium site. Typical monolithium living polymer structures containing conjugated diene hydrocarbon monomers are:

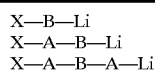    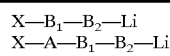

wherein B represents polymerized units of one or more conjugated diene monomers such as butadiene or isoprene, A represents polymerized units of one or more vinyl aromatic monomer such as styrene, and X is the residue of a monolithium initiator such as sec-butyllithium. B can also be a copolymer of a conjugated diene and a vinyl aromatic compound. $B_1$ and $B_2$ are formed of different dienes.

Dihydroxylated polydiene diols used in this invention may also be prepared anionically such as described in U.S. Pat. Nos. 5,391,663, 5,393,843, 5,405,911, and 5,416,168 which are incorporated by reference herein. The dihydroxylated polydiene polymer can be made using a di-lithium initiator, such as the compound formed by reaction of two moles of sec-butyllithium with one mole of diisopropenylbenzene. This diinitiator is used to polymerize a diene in a solvent typically composed of 90% w cyclohexane and 10% w diethylether. The molar ratio of diinitiator to monomer determines the molecular weight of the polymer. The living polymer is then capped with two moles of ethylene oxide and terminated with two moles of methanol to yield the desired dihydroxy polydiene.

Dihydroxylated polydiene polymers can also be made using a mono-lithium initiator which contains a hydroxyl group which has been blocked as the silyl ether. Details of the polymerization procedure can be found in U.S. Pat. No. 5,376,745 which is herein incorporated by reference. A suitable initiator is hydroxypropyllithium in which the hydroxyl group is blocked as the tert-butyl-dimethylsilyl ether. This mono-lithium initiator can be used to polymerize isoprene or butadiene in hydrocarbon or polar solvent. The living polymer is then capped with ethylene oxide and terminated with methanol. The silyl ether is then removed by acid catalyzed cleavage in the presence of water yielding the desired polymer.

A dihydroxy polybutadiene unsaturated polymer within the scope of this invention can have any butadiene microstructure. However, it preferably should have more than about 10% 1,2-butadiene addition in order to minimize its viscosity. A dihydroxy polybutadiene polymer to be used after hydrogenation can also have any butadiene microstructure. However, it is preferred that it have no less than about 30% 1,2-butadiene addition because, after hydrogenation, the polymer would be a waxy solid at room temperature if it contained less than about 30% 1,2-butadiene addition and, when used in the process of this invention, it would give a paste at room temperature instead of a low viscosity solution. Therefore, compositions based on a hydrogenated polybutadiene diol having less than about 30% 1,2-butadiene addition would have to be coated onto a substrate while the composition was at a temperature high enough that the composition is a homogeneous, low viscosity liquid. Alternatively, the composition could be dispersed in water while it is hot and then be handled as a waterborne dispersion. Although a hydrogenated polybutadiene having a 1,2-butadiene addition greater than about 30% will give compositions within this invention which are liquids at room temperature, it is preferred that the 1,2-butadiene content should be between about 40 and 60% to minimize viscosity of the hydrogenated polybutadiene diol.

When one of the conjugated dienes is 1,3-butadiene and is to be hydrogenated, the anionic polymerization of the conjugated diene hydrocarbons is typically controlled with structure modifiers such as diethylether or glyme (1,2-diethoxyethane) to obtain the desired amount of 1,4-addition. As described in U.S. Pat. No. Re 27,145 which is incorporated by reference herein, the level of 1,2-addition of a butadiene polymer or copolymer can greatly affect elastomeric properties after hydrogenation.

Linear unsaturated or hydrogenated polyisoprene diol polymers can also be used in these compositions. A dihydroxy polyisoprene polymer within the scope of this invention can have any isoprene microstructure. However, it preferably should have greater than 80% 1,4-addition of the isoprene, preferably greater than 90% 1,4-addition of the isoprene, in order to reduce the viscosity of the polymer. Polyisoprene diols of this type can be prepared by anionic polymerization in the absence of microstructure modifiers that increase 3,4-addition of the isoprene. The diene microstructures are typically determined by $C^{13}$ nuclear magnetic resonance (NMR) in chloroform.

The preferred method of making the polymers of the present invention involves the use of lithium initiators having the structure:

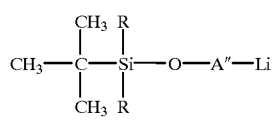

(2)

wherein each R is methyl, ethyl, n-propyl, or n-butyl and A" is an alkyl-substituted or non-substituted propyl bridging group, including —CH$_2$—CH$_2$—CH$_2$— (1,3-propyl), —CH$_2$—CH(CH$_3$)—CH$_2$— (2-methyl-1,3-propyl), and —CH$_2$—C(CH$_3$)$_2$—CH$_2$— (2,2-dimethyl-1,3-propyl), or an alkyl-substituted or non-substituted octyl bridging group, including —CH$_2$—CH$_2$—CH$_2$—CH$_2$—CH$_2$—CH$_2$—CH$_2$—CH$_2$— (1,8-octyl), because these initiators will initiate polymerization of anionic polymers at surprisingly higher polymerization temperatures with surprisingly lower amounts of dead initiator (higher efficiency) than similar initiators wherein A" is replaced by alkyl-substituted or non-substituted butyl, pentyl, or hexyl bridging groups, such as —CH$_2$—CH$_2$—CH$_2$—CH$_2$— (1,4-butyl), —CH$_2$—CH$_2$—CH$_2$—CH$_2$—CH$_2$— (1,5-pentyl), or —CH$_2$—CH$_2$—CH$_2$—CH$_2$—CH$_2$—CH$_2$— (1,6hexyl).

Certain hydroxylated polydiene polymers useful in the present invention have the structural formula

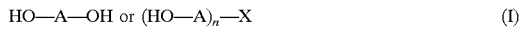

(I)

wherein A is a homopolymer of a conjugated diolefin monomer, a copolymer of two or more conjugated diolefin monomers, or a copolymer of one or more conjugated diolefin monomers with a monoalkenyl aromatic hydrocarbon monomer, where n>1 and where X is the residue of a coupling agent. During the preparation of these hydroxylated polydiene polymers, it is possible to make some mono-functional polymer having the structural formula HO—A, either by incomplete capping of the living polymer or by incomplete coupling via the coupling agent. Although it is preferred that the amount of this mono-functional polymer is minimal, satisfactory crosslinked compositions within this invention can be achieved even when the amount of mono-functional polymer is as high as 70% w of the hydroxylated polymer in the composition.

Other hydroxylated polydiene polymers useful in the present invention have the structural formula

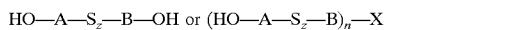

or

(II)

wherein A and B are polymer blocks which may be homopolymer blocks of conjugated diolefin monomers, copolymer blocks of conjugated diolefin monomers, or copolymer blocks of diolefin monomers and monoalkenyl aromatic hydrocarbon monomers, where S is a vinyl aromatic polymer block, where y and z are 0 or 1, where n is greater than or equal to 2, and where X is the residue of a coupling agent.

These polymers may contain up to 60% by weight of at least one vinyl aromatic hydrocarbon, preferably styrene. The A blocks and the B blocks can have a number average molecular weight of from 100 to 500,000, preferably 500 to 50,000, and most preferably 1000 to 20,000. The S block which may have a number average molecular weight of from 500 to 50,000. Either the A or the B block may be capped with a miniblock of polymer, 50 to 1000 number average molecular weight, of a different composition, to compensate for any initiation, tapering due to unfavorable copolymerization rates, or capping difficulties.

The molecular weights of the polymers are conveniently measured by Gel Permeation Chromatography (GPC), where the GPC system has been appropriately calibrated. The polymers can be characterized from the data in the chromatogram by calculating the number-average molecular weight (Mn), by calculating the weight-average molecular weight (Mw) or by measuring the "peak" molecular weight. The peak molecular weight is the molecular weight of the main specie shown on the chromatogram. For anionically polymerized linear polymers, the polymer is nearly monodisperse (Mw/Mn ratio approaches unity), and usually it is adequately descriptive to report the peak molecular weight of the narrow molecular weight distribution observed. Usually, the peak molecular weight value is between Mn and Mw. For polydisperse polymers the number average molecular weight should be calculated from the chromatograph and used. The materials used in the columns of the GPC are styrene-divinyl benzene gels or silica gels. The solvent is tetrahydrofuran and the detector is a refractive index detector.

The polymers of this invention may be hydrogenated as disclosed in U.S. Pat. No. Reissue 27,145 which is herein incorporated by reference. The hydrogenation of these polymers and copolymers may be carried out by a variety of well established processes including hydrogenation in the presence of such catalysts as Raney Nickel, noble metals such as platinum and the like, soluble transition metal catalysts and titanium catalysts as in U.S. Pat. No. 5,039,755 which is also incorporated herein by reference. The polymers may have different diene blocks and these diene blocks may be selectively hydrogenated as described in U.S. Pat. No. 5,229,464 which is also incorporated herein by reference.

The crosslinking agents which are useful in the present invention are amino resins. For the purposes of this invention, an amino resin is a resin made by reaction of a material bearing NH groups with a carbonyl compound and an alcohol. The NH bearing material is commonly urea, melamine, benzoguanamine, glycoluril, cyclic ureas, thioureas, guanidines, urethanes, cyanamides, etc. The most common carbonyl component is formaldehyde and other carbonyl compounds include higher aldehydes and ketones. The most commonly used alcohols are methanol, ethanol, and butanol. Other alcohols include propanol, hexanol, etc. CYTEC (formerly American Cyanamid) sells a variety of these amino resins, as do other manufacturers. CYTEC's literature describes three classes or "types" of amino resins that they offer for sale.

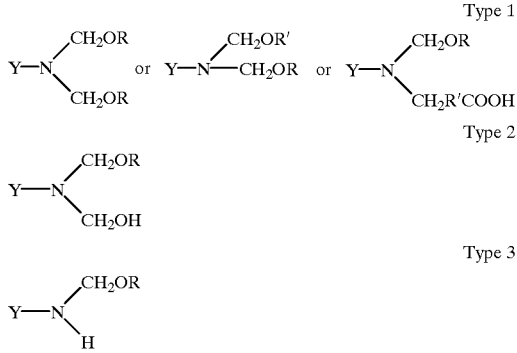

where Y is the material that bore the NH groups, the carbonyl source was formaldehyde and R is the alkyl group from the alcohol used for alkylation. Although this type of description depicts the amino resins as monomeric material of only one pure type, the commercial resins exist as mixtures of monomers, dimers, trimers, etc. and any given resin may have some character of the other types. Dimers, trimers, etc. also contain methylene or ether bridges. Generally, Type 1 amino resins are preferred in the present invention.

The following Type 1 amino resins can be used to achieve the purpose of the present invention: CYMEL® 303—a melamine-formaldehyde resin where R is $CH_3$, CYMEL® 1156—a melamine-formaldehyde resin where R is $C_4H_9$, CYMEL® 1141—a carboxyl modified melamine-formaldehyde resin where R is a mixture of $CH_3$ and i-$C_{49}$, CYMEL® 1170—a glycoluril-formaldehyde resin where R is $C_4H_9$, and BEETLE® 80—a urea-formaldehyde resin where R is $C_4H_9$. All of these products are made by CYTEC and are described in the American Cyanamid publication 50 *Years of Amino Coating Resins*, edited and written by Albert J. Kirsch, published in 1986 along with other amino resins useful in the present invention.

The butylated amino resins generally have fairly good compatibility with the hydroxy functional polydiene polymers while the methylated amino resins generally are incompatible with the hydroxy functional diene polymers. However, the amino resins do not necessarily have to be completely compatible with the polymer and give phase stable mixtures when merely mixed together because the partial reaction disclosed in this invention can overcome this incompatibility, giving resins which will not phase separate.

The reinforcing agent is a low molecular weight material having at least two functional groups which will react with the amino resin crosslinker when the composition is heated. The number average molecular weight preferably is from 60 to 600, most preferably 60 to 120. Suitable functional groups include primary and secondary alcohols as well as dicarboxylic acids or anhydrides. The equivalent weight of the reinforcing agent will usually be between about 30 and about 150 grams per functional group, preferably between about 50 and 100 grams per functional group. The functionality of the reinforcing agent should be at least two and can be as high as desired with the proviso that increasing the functionality increases the polarity which adversely affects the compatibility of the reinforcing agent with the polydiene diol. However, if the reinforcing agent can be blended or cooked into the composition, the functionality is acceptable.

Reinforcing agents suitable for use in the present invention include unsubstituted aliphatic diols such as ethylene glycol, 1,3-propane diol, 1,4-butane diol, 1,6hexane diol, and dimer diol, substituted aliphatic diols such as 1,2-propane diol, 2-methyl-1,3-propane diol (MP-diol from Arco), neopentyl glycol, 2-ethyl-1,3-hexane diol (PEP diol), 2,2,4-trimethyl-1,3-pentane diol (TMPD diol), and 2-butyl-2-ethyl-1,3-propane diol (BEPD diol), cycloaliphatic diols such as cyclohexane dimethanol and 4,4-isopropylidenedicyclohexanol (HBPA), and aromatic diols such as 4,4-isopropylidenediphenol (Bisphenol A) (BPA). Triols such as glycerol, trimethylol ethane, and trimethylol propane may also be used. Analogous unsubstituted and substituted carboxylic acids may also be used. Preferred materials for use herein are aliphatic diols having 5 to 40 carbon atoms, especially alkyl-substituted aliphatic diols such as PEP diol, TMPD diol, and BEPD diol because they are substituted, branched diols and, as such, are not as incompatible with the polydiene polymers as unsubstituted, straight chain diols.

A proton-donating acid catalyst is often, but not always, required to achieve the purposes of the present invention, i.e., crosslink the polymer and reinforcer using the amino resin crosslinkers described above. Sometimes, a catalyst is not necessary such as when CYMEL 1141 is the crosslinking agent because its acid functionality alone is sufficient to catalyze the partial reaction needed to obtain compatibility as well as subsequent crosslinking reactions. When a catalyst is used, it is normal that the amount of the acid catalyst used range from about 0.05 to about 4% w of the polymer/reinforcer/amino resin mixture to be certain there is sufficient acid but an excess can be undesirable. Most preferably, an amount from about 0.1 to about 2% w of the polymer/reinforcer/amino resin is used. The presence of a strong proton-donating acid is normally required to catalyze the crosslinking reaction of many amino resins which are useful in the present invention. However, some medium strength and even relatively weak acids may also be effective depending upon the amino resins used. Generally, the most active catalysts are those with the lowest pKa values. The following list of acid catalysts which may be used in the present invention is arranged according to increasing pKa value: mineral acids, Cycat® 4040 catalyst (p-toluene sulfonic acid), Cyca® 500 catalyst (dinonylnaphthalene disulfonic acid), Cycat® 600 catalyst (dodecyl benzene sulfonic acid), oxalic acid, maleic acid, hexamic acid, phosphoric acid, Cycat® 296-9 catalyst (dimethyl acid pyrophosphate), phthalic acid and acrylic acid. Other acids which may be used are described in the aforementioned American Cyanamid Company publication. Also, 3M Brand Resin Catalyst FC-520 (diethylammonium salt of trifluoromethane sulfonic acid) may be used. Cycat® 600 was found to be a very useful catalyst.

The compatible compositions of the present invention are prepared by mixing the polydiene polymer, the amino resin crosslinker, and the reinforcer together. An effort should be made to make the mixture as homogeneous as is reasonably possible. The components are then partially reacted (incompletely reacted) in an appropriate vessel. It is important that the reaction not proceed too far or the composition will be too high in viscosity, making application very difficult or impossible or the composition may even crosslink in the vessel. But, enough reaction must be accomplished to overcome incompatibility of the components to give a resin which will not phase separate upon standing, or more preferably, is homogeneous and clear. Conditions for cooking a particular composition which will give a satisfactory product depend considerably on the composition and must be determined empirically for each composition. For example, it was found that when cooking a resin containing an acid-functional melamine resin, the acid on the resin was usually sufficient to catalyze the reaction so little or no extra catalyst was needed. It was also found that cooking a resin containing a relatively incompatible methylated melamine at 100° C. for 1 hour was not sufficient to give a phase stable composition, cooking 2 hours was satisfactory, and cooking 4 hours caused the resin to gel. Cooking another composition containing the more compatible butylated melamine resin for 1 hour at 100° C. was satisfactory to give a clear, phase stable composition. Thus, satisfactory cooking conditions will be those combinations of catalyst concentration, cooking time, and cooking temperature which are sufficient to give a phase-stable, preferably clear composition. Thus, general recommendations are to do the reactions at 60 to 120° C. for 0.5 to 10 hours, usually about 1 to 3 hours, in the presence of a small portion of catalyst. The catalyst can be the same one which will be needed to entirely crosslink the composition after it has been applied to the substrate and is baked. It is frequently found that the amount of catalyst needed in the partial reaction step is usually less than about half of the total catalyst needed to obtain the desired amount of crosslinking in the final product. The partially reacted mixture is then still in a physical form that allows convenient and easy application thereof as desired.

The partially reacted mixture and the rest of the catalyst required for crosslinking are then mixed together and the mixture is applied to a substrate. The substrate is then baked at 100 to 250° C. for 0.01 to 2 hours to effect crosslinking.

Although use of solvent may not be necessary, solvent can be included in with the polymer/reinforcer/amino resin mixture to reduce the viscosity such that the partially reacted mixture can be easily stirred during the partial reaction or to facilitate application of the finished resin. Suitable solvents include hydrocarbon solvents such as naphtha, mineral spirits, toluene, xylene, etc., and oxygenated solvents such as esters, ketones, ethers and alcohols. Two common solvents which are well suited and which were used in much of this work are naphtha and isobutyl acetate. If the partially reacted resin will be dispersed in water for application as a water based product, use of a water soluble solvent, such as BUTYL OXITOL or diacetone alcohol, may be advantageous. Solvent contents of up to 70% w of the polymer/reinforcer/amino resin/solvent mixture can be used. However, it is usual with these compositions that the solvent content is 40% by weight or less.

For applications in which the resin must have low viscosity but in which solvent content must be low or even zero, it may be necessary to disperse the partially reacted resin in water and apply it as a waterborne composition. In this case, the partial reaction and subsequent dispersion should be done with little or no solvent present. Dispersion of the partially reacted resin in water can be accomplished either by the inversion process or by the direct emulsification process. In the inversion process, the surfactant is added to the organic phase which has been heated to a temperature high enough to give the resin a viscosity low enough that it can be efficiently stirred. Typical temperatures are from about 40 to about 90° C. While stirring the resin vigorously, as with a 4-bladed stirrer rotating at about 2000 rpm, water is slowly added. When a volume of water about equal to the volume of the organic phase has been added, the mixture will invert from organic continuous to water continuous, thereby making the waterborne dispersion. More water is then added to reduce the viscosity to the desired range. In the direct emulsification process, surfactant is added to the required amount of water, typically about 150 parts by weight per 100 parts of organic resin. The organic resin is then dispersed in the soapy water with a high shear mixer, such as a Silverson mixer/emulsifier operating at about 6000 rpm. A wide variety of surfactants could be used, including anionic surfactants, nonionic surfactants and cationic surfactants. A particularly effective surfactant is the anionic surfactant made by neutralizing CYCAT® 600 with a tertiary amine such as triethyl amine or dimethylaminoethanol. This compound not only functions as the surfactant to stabilize the dispersion in water but, after the composition is applied to a substrate, the amine evaporates during the bake step, allowing the CYCAT 600 to catalyze the cure with the amino resin.

In the solids portion of the crosslinkable composition, the hydroxy functional diene polymer should comprise from 10 to 80 percent by weight (% w) of the polymer/reinforcer/crosslinker composition. The reinforcing agent should comprise from 2 to 40% w of the composition, and the amino resin should comprise from 8 to 60% w of the composition. If the polymer is used at less than 10% w, then the cured composition will be too brittle for most applications. If it is used at more than 80%, then the concentrations of crosslinker and reinforcer will be too low and the composition will not cure to high strength and will be too soft for many applications. If the concentration of the reinforcer is too low, then the cured composition will be too soft for many applications, and if it is too high, then the crosslink density will be too high and the composition will again be too brittle. If the concentration of the amino resin is too low, then the strength will not be as high as desired, and if the concentration is too high, then homopolymerization of the amino resin will cause the cured composition to be too brittle.

The crosslinked materials of the present invention are most useful in coatings, especially in coatings applications which require hard, glossy surfaces such as coatings for metal buildings or furniture or coatings for difficult to bond to substrates such as oily metal or plastic substrates. They are also useful in certain kinds of adhesives (including assembly adhesives, structural adhesives, laminating adhesives and contact adhesives), sealants, films (such as those requiring heat and solvent resistance), etc. However, it may be necessary for a formulator to combine a variety of ingredients together with the compositions of the present invention in order to obtain products having the proper combination of properties (such as adhesion, cohesion, durability, low cost, etc.) for particular applications. Thus, a suitable formulation might be only the partially reacted resin consisting of the polymers of the present invention, the reinforcing agent and the amino resin curing agent. However, in many adhesive, sealant and coating applications, suitable formulations would also contain various combinations of resins, plasticizers, fillers, solvents, stabilizers, surfactants and other ingredients such as asphalt. The following are some typical examples of formulating ingredients for adhesives, sealants and coatings.

In adhesive applications, as well as in coatings and sealants, it may be necessary to add an adhesion promoting or tackifying resin that is compatible with the composition. A common tackifying resin is a diene-olefin copolymer of piperylene and 2-methyl-2-butene having a softening point of about 95° C. This resin is available commercially under the tradename Wingtack® 95 and is prepared by the cationic polymerization of 60% piperylene, 10% isoprene, 5% cyclopentadiene, 15% 2-methyl-2-butene and about 10% dimer, as taught in U.S. Pat. No. 3,577,398. Other tackifying resins may be employed wherein the resinous copolymer comprises 20–80 weight percent of piperylene and 80–20 weight percent of 2-methyl-2-butene. The resins normally have ring and ball softening points as determined by ASTM method E28 between about 80° C. and 115° C. In some cases, however, liquid resins may also be used.

Other adhesion promoting resins which are also useful in the compositions of this invention include hydrogenated rosins, esters of rosins, polyterpenes, terpenephenol resins, polymerized mixed olefins, aromatic resins including coumarone-indene resins, polystyrene resins, vinyl toluene-alpha methylstyrene copolymers and polyindene resins. To obtain good thermo-oxidative and color stability, it is preferred that the adhesion promoting resin be a saturated resin, e.g., a hydrogenated dicyclopentadiene resin such as Escorez® 5000 series resin made by Exxon or a hydrogenated polystyrene or polyalphamethylstyrene resin such as Regalrez® resin made by Hercules. The amount of adhesion promoting resin employed varies from 0 to 200 parts by weight per hundred parts of partially reacted resin (phr), preferably between 20 to 150 phr, most preferably 20 to 100 phr. The selection of which particular adhesion promoting resin to use is, in large part, dependent upon the specific composition of the partially reacted resin employed in the respective adhesive composition.

The composition of the instant invention may contain plasticizers, such as rubber compounding oils. Rubber compounding oils are well-known in the art and include both high saturates content oils and high aromatics content oils. Preferred plasticizers are highly saturated oils, e.g. Tufflo® 6056 and 6204 oil made by Arco and process oils, e.g. Shellflex® 371 oil made by Shell. The amounts of rubber compounding oil employed in the invention composition can vary from 0 to about 200 phr, preferably between about 0 to about 100 phr, and most preferably between about 0 and about 50 phr.

This invention provides a process for painting a substrate requiring priming, such as steel, which comprises: (a) coating the substrate with a primer selected from the group consisting of epoxy resin primers and polyester resin primers, (b) applying to the primed substrate a crosslinkable basecoat composition comprising from 10 to 80 percent by weight of a dihydroxylated polydiene polymer, from 8 to 60 percent by weight of an amino resin crosslinking agent, and from 2 to 40 percent by weight of a reinforcing agent, and (c) applying over the basecoat a clearcoat selected from the group consisting of dihydroxy polydiene-based clearcoats, polyester clearcoats, and acrylic clearcoats.

The primers which may be used in the process of the present invention are those which are commonly used as primers for steel substrates including epoxy resin primers and polyester primers. Epoxy resin primers are normally based on the diglycidyl ether of Bisphenol A (DGEBA), such as EPON® 828 resin (Shell Chemical). To prepare the resin, the DGEBA is reacted with Bisphenol A (BPA) to generate a higher molecular weight epoxy resin which has secondary hydroxyl functional groups. The curing agent for this epoxy polyol is typically an amino resin or a polyisocyanate. After being suitably formulated, the epoxy primer can be applied from solution in a solvent such as xylene or it can be applied as a solvent free powder. A particularly desirable method of applying the epoxy primer is by the cathodic electrodeposition (CED) process. A typical resin preparation and formulation of a waterborne epoxy primer which can be applied by the CED process is given in U.S. Pat. No. 4,883,572 which is herein incorporated by reference. Again the DGEBA is reacted with BPA to give a higher molecular weight epoxy polyol. The epoxy groups on the resin are then reacted with a secondary amine, such as methylaminoethanol, and the tertiary amine formed is ionized with an acid, such as lactic acid. The ionic species make the resin dispersable in water. After formulating the resin with suitable curing agent, corrosion inhibitor package, and various other components, the primer can be applied and cured by baking, typically for 20 minutes at about 180° C.

Polyester polyols can also be used in the primers. These polyester polyols are also normally cured with amino resins or polyisocyanates. Typically, the polyester polyols are synthesized by carrying out a condensation reaction using a glycol or a mixture of glycols and an anhydride or diacid compound or a mixture of anhydrides or diacid compounds. The condensation reactions typically are done at temperatures of 175 to 235° C. in a resin kettle which is capable of removing the water of condensation. Typical glycols used in the polyester polyol synthesis are the same as the reinforcing agents described above for use in the novel coating compositions of this invention. Especially preferred are ethylene glycol, 1,4-butane diol, and neopentyl glycol. The anhydrides and diacids which can be used in the polyester synthesis are well known. Anhydrides and diacids which are frequently used in polyesters for primers are phthalic anhydride, isophthalic acid, and adipic acid. A fairly complete list of hydroxy functional and acid functional compounds which are used in polyesters is given in Bulletin IP-65c, "How to Process Better Coating Resins with Amoco PIA and TMA" from Amoco Chemical Company, 1992.

Polyester primers can be applied from a solution in organic solvent or as a solvent free powder. However, a preferred method of application is as a waterborne coating. The technology for preparation of waterborne polyester coating resins can be found in U.S. Pat. No. 4,054,614 which is herein incorporated by reference. A polyester is prepared which has acid functional groups. These acid groups are neutralized with a tertiary amine, such as dimethylaminoethanol, and the resin is dispersed in water. After formulation with suitable crosslinkers, corrosion inhibitors, and any other ingredients necessary to give good performance, the primer is applied and cured by baking, typically for 30 minutes at about 150° C.

Curing agents for the primers are typically amino resins or polyisocyanates. The amino resins which are used are the same types which are described above for use in the compositions of this invention. Polyisocyanates used in primers are usually based on toluene diisocyanate (TDI) or 4,4-diphenyl methane diisocyanate (MDI). These diisocyanates are typically converted to triisocyanates by, for example, condensing 3 moles of diisocyanate to form an isocyanurate ring structure or by reaction of 3 moles of diisocyanate with a triol such as trimethylolpropane. The polyisocyanate will cure the polyol at ambient temperature in a two component coating. Alternatively, the isocyanate groups can be blocked with a volatile blocking agent, such as phenol, and the blocked polyisocyanate will deblock when baked at temperatures of about 180° C., regenerating the polyisocyanate which will cure the polyol.

The primary functions of the primer coating are to prevent corrosion of the substrate, to provide a surface which is smooth or which can be sanded smooth, and to provide a surface to which an additional coating will adhere. It has been found that the coatings of this invention adhere very well to these primers. The coatings (basecoats) of this invention will almost always be pigmented to provide the desired color to the coated part and also to protect the primer again degradation by sunlight and the environment. In other words, the basecoat is the "paint" for the substrate. This pigmented coating based on the compositions of this invention will frequently also be coated with a clearcoat coating (clearcoat) to improve the appearance of the coated part and also to protect the pigmented coating against degradation.

Resins for the clearcoat coatings typically will contain either a polyester polyol or an acrylic polyol and the curing agent for the polyol will be either an amino resin or a polyisocyanate. The polyester polyols in the clearcoat are very similar to those in the primer except that only alcohol and acid functional components which have good stability, especially to sunlight, will be used in the polyester synthesis. The acrylic polyols used in clearcoats are made by free radical polymerization, usually in solution in an organic solvent or in a suspension polymerization if the coating will be applied as a powder. There is a wide variety of acrylate and methacrylate monomers which are commercially available for use in acrylics. The acrylic monomers which will be used in polymerization will be selected to give the acrylic polyol the proper properties. Two of the important properties of the acrylic polyol are its glass transition temperature (which will usually be between 0 and 50° C.) and its hydroxy equivalent weight (which will usually be between 200 and 1000). Thus, a typical polymerization might use a combination of methyl methacrylate, butyl acrylate and hydroxy ethyl acrylate.

The crosslinkers for the polyester polyol or acrylic polyol in the clearcoat will be quite similar to those in the primers except that only stable crosslinkers will be used. The amino resins of the type described above for use in the compositions of this invention are used as crosslinkers for baked clearcoats. Only light stable isocyanates will be used. These are based on hexane diisocyanate (HDI), isophorone diisocyanate (IPDI) or 4,4-dicyclohexyl methane diisocyanate (HMDI). These diisocyanates will usually be converted to triisocyanates and they will be blocked if they will be used to cure the polyol in a bake system. The clearcoat coatings will usually be formulated with wetting agents to improve flow and reduce surface defects, and with stabilizers, especially to protect the clearcoat as well as the basecoat against degradation by sunlight.

Optional components of the present invention are stabilizers. Antioxidants are added to protect the compositions against heat degradation and oxidation during the preparation, storage, cure, and use of the compositions. Ultraviolet light stabilizers are added to protect the compositions against degradation cause by sunlight.

Pigments will often be included in the coating (paint) composition to give the painted part the desired color and appearance. Various types of fillers can be included in the formulation. This is especially true for exterior coatings or sealants in which fillers are added not only to create the desired appeal but also to improve the performance of the coatings or sealants such as their weatherability. A wide variety of fillers can be used. Suitable fillers include calcium carbonate, clays, talcs, silica, zinc oxide, titanium dioxide and the like. The amount of filler usually is in the range of 0 to about 65% w based on the solvent free portion of the formulation depending on the type of filler used and the application for which the coating or sealant is intended. An especially preferred filler is titanium dioxide because it is very effective at improving resistance of compositions to degradation by exposure to sunlight.

The only three ingredients that will always be used in all adhesives, coatings or sealants of this invention are the hydroxy functional diene polymer, the amino resin curing agent, and the reinforcing agent. Beyond these ingredients, the formulator will choose to use or not to use among the various resins, fillers and pigments, plasticizers, stabilizers and solvents disclosed herein. No definite rules can be offered about which ingredients will be used. The skilled formulator will choose particular types of ingredients and adjust their concentrations to give exactly the combination of properties needed in the composition for any specific adhesive, coating or sealant application.

Adhesives are frequently thin layers of sticky compositions which are used in protected environments (adhering two substrates together). Therefore, unhydrogenated diene polymers will usually have adequate stability so resin type and concentration will be selected for maximum stickiness without great concern for stability, and pigments will usually not be used.

Coatings are frequently thin, non-sticky, pigmented compositions applied on a substrate to protect or decorate it. Therefore, hydrogenated diene polymers may be needed to give adequate durability. Resins will be selected to assure maximum durability and minimum dirt pick-up. Fillers and pigment will be selected carefully to give appropriate durability and color. Coatings will frequently contain relatively high solvent concentration or will be waterborne dispersions to allow easy application and give a smooth dry coating.

Sealants are gap fillers. Therefore, they are used in fairly thick layers to fill the space between two substrates. Since the two substrates frequently move relative to each other, sealants are usually low modulus compositions capable of withstanding this movement. Since sealants are frequently exposed to the weather, hydrogenated polymers are usually used. Resins and plasticizers will be selected to maintain low modulus and minimize dirt pick-up. Fillers and pigment will be selected to give appropriate durability and color. Since sealants are applied in fairly thick layers, solvent content is as low as possible to minimize shrinkage.

A formulator skilled in the art will see tremendous versatility in the hydroxy functional diene polymer/reinforcer/crosslinker compositions of this invention to prepare coatings, adhesives and sealants having properties suitable for many different applications.

EXAMPLES

The following examples demonstrate the utility of the inventive compositions containing hydroxy terminated polydiene polymers, amino resins, and reinforcing agents which have been cooked to obtain compatibility and subsequently cured. The polymers used in the examples are characterized in Table 1 where Bd is an unhydrogenated polybutadiene block, EB is a hydrogenated polybutadiene block, and S/EB indicates a random copolymer block of styrene and hydrogenated butadiene.

TABLE 1

| Polymer | Type | $M_n$ | Functionality | 1,2-Bd Content, % | Styrene Content, % w |
|---|---|---|---|---|---|
| A | HO-EB-OH | 3300 | 1.9 | 48 | 0 |
| B | HO-Bd-OH | 3400 | 1.9 | 40 | 0 |
| C | HO-EB-OH | 2000 | 1.9 | 84 | 0 |
| D | HO-EB-OH | 2700 | 2.4 | 20 | 0 |
| E | HO-S/EB-OH | 3500 | 1.85 | 40 | 26 |
| F | HO-S/EB-OH | 4300 | 1.8 | 37 | 43 |

Thus, Polymer A was a hydrogenated polybutadiene diol having a number average molecular weight of 3300, an average functionality of 1.9 hydroxyls per molecule, and a 1,2-Bd/1,4-Bd addition ratio of 48/52. Polymer B was a diol similar to Polymer A except the polybutadiene was not hydrogenated. Polymer C was similar to Polymer A except the 1,2-Bd/1,4-Bd ratio was 84/16. Polymer D was similar to Polymer A except the average functionality was 2.4 hydroxyls per molecule and the 1,2-Bd/1,4-Bd ratio was 20/80. Polymers E and F were similar to Polymer A except they also contained 26% w and 43% w styrene copolymerized with the hydrogenated polybutadiene.

The other components used in the examples are described in Table 2.

TABLE 2

| Component | Supplier | Description |
|---|---|---|
| Crosslinkers | | |
| CYMEL 1141 | CYTEC | Acid-functional, methylated/butylated melamine/formaldehyde, eq wt 150–250 |
| CYMEL 1156 | CYTEC | Liquid, butylated melamine/formaldehyde resin, 2.2 functionality |
| CYMEL 303 | CYTEC | Liquid, methylated melamine/formaldehyde resin, 2.2 functionality |
| DESMODUR BL-3175 | Bayer | Blocked HDI based triisocyanate |
| Catalyst | | |
| CYCAT 600 | CYTEC | Dodecylbenzene sulfonic acid |
| DABCO T-12 | Air Products | Dibutyl tin dilaurate |
| Reinforcing Diols | | |
| TMPD Diol | Eastman | 2,2,4-trimethyl-1,3-pentane diol, mp = 54° C. |
| BEPD Diol | Eastman | 2-butyl-2-ethyl-1,3-propane diol, mp = 40° C. |
| HBPA | Shell | 4,4-isopropylidenedicyclohexanol, mp = 160° C. |
| BPA | Shell | 4,4-isopropylidenediphenol, mp = 155° C. |
| Solvents | | |
| VM&P Naphtha HT | Shell | Aliphatic hydrocarbon mixture, bp = 119–139° C. |
| Isobutyl acetate | Aldrich | Isobutyl acetate, bp = 116° C. |
| Other Components | | |
| DESMOPHEN 670A-80 | Bayer | Polyester polyol, 80% w in butyl acetate, 500 hydroxy eq wt |
| DESMOPHEN 365 | Bayer | Acrylic polyol, 65% w in butyl acetate/xylene (3/1), 607 hydroxy eq wt |
| TiPure R-706 | DuPont | Titanium dioxide pigment |

Coatings made according to the present invention were evaluated for mechanical properties after they were applied to a substrate and cured by baking. The general appearance (clarity, gloss, adhesion, and mar resistance) of the coatings was judged visually and described qualitatively. The pencil hardness (gouge) of the coatings was measured according to the ASTM D3363 method of pushing successively softer pencil leads across the coating until the pencil lead will no longer gouge through the coating. The hardness scale (softest to hardest) is

6B<5B<4B<3B<2B<B<HB<F<H<2H <3H<4H<5H<6H

Rocker hardness was measured by ASTM D2134 using a Sward type hardness rocker. This test measures the number of rocks the rocker will make on the coating before the amplitude decreases from a fixed starting angle to a fixed ending angle. The value is expressed as the percentage of rocks the test sample gave relative to the number of rocks the rocker would make on a glass substrate. The methyl ethyl ketone (MEK) resistance of the coatings was measured according to the ASTM D4752 method of rubbing an MEK-moistened cloth across the coating for 100 cycles, or until breakthrough to the metal substrate occurred (one cycle equals one forward and one backward stroke). It should be cautioned that, in cases where the coatings had poor adhesion to steel, the hardness and MEK resistance values may be misleading since the coatings may be merely scraped off the steel instead of being gouged through or rubbed through. This poor adhesion to steel would have the effect of making the coatings appear softer in the hardness test than they really are and making them appear poorly cured in the MEK resistance test when they actually may be well cured. Adhesion of the coatings was measured with the crosshatch adhesion test, ASTM D3359, Method B. In this test, a lattice pattern is scribed through the coating, pressure sensitive tape is applied and removed, and the amount of coating removed with the tape is rated. The scale ranges from 5 (no adhesion loss) to 0 (greater than 65% adhesion loss).

An integral part of this invention is the process of cooking the components of these compositions to overcome their inherent incompatibility. Conditions of catalyst concentration, cooking time, and cooking temperature necessary to prepare phase stable compositions varied from one formulation to another and had to be determined by trial and error for each formulation. Phase stable combinations of the polymer, reinforcer, and crosslinker could usually be obtained by cooking them together in a resin kettle for about 1–3 hours at about 100° C. using varying amounts of acid catalyst, CYCAT 600. The catalyst concentration, cooking time, and cooking temperature actually used for each composition is shown in the tables. For convenience, the cooks were typically done at 60% w solids content in solvent, either isobutyl acetate or VM&P naphtha, to give the resin a manageable viscosity. Viscosities at 25° C. were measured on some of the compositions using a Brookfield viscometer. Prior to casting films, the acid catalyst content was typically increased to 1 part by weight (pbw) in order to accomplish cure during bake. Unless specified otherwise, coatings were applied on cold rolled steel panels (QD412 panels from Q-Panel Corp.) with a #52 wire wound rod and cured by baking 20 minutes at 175° C. Coatings were applied on thermoplastic olefin panels (Himont ETA-3081 panels from ACT Corp.) and cured by baking 1 hour at 121° C.

Comparative Example

Table 3 presents properties of coatings made with Polymer A using the conventional technology of curing diols with melamine resins, without the reinforcing agents of this invention.

TABLE 3

| Composition, pbw | 3-1 | 3-2 | 3-3 |
|---|---|---|---|
| Polymer A | 80 | 80 | 80 |
| CYMEL 303 | 20 | — | — |
| CYMEL 1156 | — | 20 | — |
| CYMEL 114 | — | — | 20 |
| CYCAT 600 | 0.4 | 0.4 | 0 |
| VM&P naphtha | 67 | 67 | — |
| Isobutyl acetate | — | — | 67 |
| Cook Time, hr | 1 | 1 | 1 |
| Cook Temp,° C. | 100 | 80 | 100 |
| Appearance of Resin | | | |
| Phase stable? | yes | yes | no |
| Clarity | clear | clear | grainy |
| Viscosity @ 25° C., cps | 15000 | nd | — |
| Properties on QD412 | | | |
| Thickness, mil | 1.0 | 0.6 | — |

TABLE 3-continued

| Composition, pbw | 3-1 | 3-2 | 3-3 |
|---|---|---|---|
| Pencil Hardness | B | 4 B | — |
| MEK Rubs | 4 | 2 | — |
| Crosshatch Adhesion | 0 | 0 | — |
| General Appearance | | | |
| Clarity | clear | clear | — |
| Gloss | high | high | — |
| Adhesion to Steel | v. Poor | v. Poor | — |
| Mar Resistance | v. poor | v. Poor | — |
| Properties on ETA-3081 | | | |
| Crosshatch Adhesion | 5 | 5 | — |

The results show that conditions of 0.4 pbw of catalyst and cooking 1 hour at 100° C. were sufficient to give a phase stable composition with Formulation 3-1. The butylated melamine, CYMEL 1156, used in Formulation 3-2 is somewhat more compatible with Polymer A and so the somewhat more mild cooking temperature of 80° C. was sufficient to give a phase stable composition. No combination of cooking time, temperature, and catalyst concentration was found which gave a satisfactory composition with Formulation 3.3. The acid functionality on the CYMEL 1141 seemed to catalyze the reaction so no CYCAT 600 was needed. In fact, when as little as 0.4 pbw of CYCAT 600 was added, the resin gelled quickly during the resin cook. When cook times shorter than 1 hour were used, the resins made were not phase stable and would separate upon standing at room temperature. When cook times longer than 1 hour were used, the resin became too high in viscosity and, after several hours of cooking, the resin gelled.

The results in Table 3 show that both Formulations 3-1 and 3-2 had poor adhesion to unprimed steel but excellent adhesion to thermoplastic polyolefin (TPO) substrate. However, both compositions gave coatings which were very soft and weak, thus giving them very poor mar resistance and making them unsuitable for use in practical applications.

The results of the Comparative Example show that, to be useful, coatings based on the hydroxy terminated polydiene polymers and melamine resins will have to be harder and stronger. This could be accomplished by also including a low molecular weight reinforcing diol, such as TMPD diol or BEPD diol, in the formulation. But these low molecular weight diols are quite polar and therefore have poor compatibility with the hydroxy terminated polydiene polymers described above and mixtures with them are not phase stable. However, this invention demonstrates that phase stable compositions can be prepared containing the reinforcing diols by carrying out the partial reaction of the components using the method of this invention as described above. The results of experiments which demonstrate this invention are given in Tables 4, 5, 6 and 7.

Example 1

Effect of Melamine Resin and Reinforcing Diol Type

Table 4 presents results on formulations containing two low molecular weight, branched, reinforcing diols with two butylated melamine resins in formulations containing 40 pbw of Polymer A.

TABLE 4

| Composition, pbw | 4-1 | 4-2 | 4-3 | 4-4 |
|---|---|---|---|---|
| Polymer A | 40 | 40 | 40 | 40 |
| TMPD diol | 20 | | 20 | |
| BEPD diol | | 20 | | 20 |
| CYMEL 1156 | 40 | 40 | | |
| CYMEL 1141 | | | 40 | 40 |
| CYCAT 600 | 0.4 | 0.4 | 0 | 0 |
| VM&P naphtha | 67 | 67 | 67 | 67 |
| Cook Time, hr | 2 | 2 | 2 | 2 |
| Cook Temp., ° C. | 100 | 100 | 100 | 100 |
| Appearance of Resin | | | | |
| Phase stable? | yes | yes | yes | yes |
| Clarity | clear | clear | clear | clear |
| Viscosity @ 25° C., cps | 125 | 230 | 170 | 205 |
| Properties on QD412 | | | | |
| Thickness, mil | 1.3 | 1.0 | 1.0 | 0.9 |
| Pencil Hardness | HB | 3 B | H | H |
| MEK Rubs | >100 | 22 | 100 | >100 |
| Crosshatch Adhesion | 0 | 0 | 1 | 0 |
| General Appearance | | | | |
| Clarity | clear | clear | clear | clear |
| Gloss | high | high | high | high |
| Adhesion to Steel | poor | poor | good | poor |
| Mar Resistance | good | good | good | good |
| Properties on ETA-3081 | | | | |
| Crosshatch Adhesion | 5 | 5 | 5 | 5 |

The results show that both TMPD diol and BEPD diol can be cooked into resins based on Polymer A using either CYMEL 1156 or CYMEL 1141 to give phase stable compositions. Clear resins could be made with CYMEL 1156 using 0.4 pbw of CYCAT 600 catalyst. Since the acid group on CYMEL 1141 can catalyze the reactions, no CYCAT 600 was needed in the cooks with CYMEL 1141 to achieve phase stable blends. All four of the compositions have much better mar resistance than the Comparative Example. Formulations 4-1 and 4-2 in Table 4 have very poor adhesion to steel and can be rubbed off the steel readily with mild finger pressure. Formulations 4-3 and 4-4, containing the acid functional melamine resin, have much better adhesion in this qualitative test but still have low adhesion to steel in the crosshatch adhesion test. All four formulations, however, have excellent adhesion to TPO which is generally considered to be a difficult substrate to adhere to.

Example 2

Effect of Concentration of Polymer A

The results in Table 5 show the effect of the concentration of the hydroxy terminated diene polymer in formulations containing TMPD diol with two butylated melamine resins.

TABLE 5

| Composition, pbw | 5-1 | 5-2 | 5-3 | 54 | 5-5 | 5-6 |
|---|---|---|---|---|---|---|
| Polymer A | 40 | 40 | 30 | 30 | 20 | 20 |
| TMPD diol | 20 | 20 | 20 | 20 | 30 | 30 |
| CYMEL 1156 | 40 | — | 50 | — | 50 | — |
| CYMEL 1141 | — | 40 | — | 50 | — | 50 |
| CYCAT 600 | 0.4 | 0 | 0.4 | 0 | 0.4 | 0 |
| VM&P naphtha | 67 | 67 | 67 | 67 | 67 | 67 |
| Cook Time, hr | 2 | 2 | 2 | 2 | 2 | 2 |
| Cook Temp., ° C. | 100 | 100 | 100 | 100 | 100 | 100 |

TABLE 5-continued

| Composition, pbw | 5-1 | 5-2 | 5-3 | 54 | 5-5 | 5-6 |
|---|---|---|---|---|---|---|
| Appearance of Resin | | | | | | |
| Phase stable? | yes | yes | yes | yes | yes | yes |
| Clarity | clear | clear | clear | clear | clear | clear |
| Viscosity @ 25° C., cps | 125 | 170 | 75 | 150 | 40 | 60 |
| Properties on QD412 | | | | | | |
| Thickness, mil | 1.3 | 1.0 | 1.1 | 1.2 | 1.2 | 0.9 |
| Pencil Hardness | HB | H | B | H | H | H |
| MEK Rubs | >100 | 100 | >100 | >100 | >100 | >100 |
| Crosshatch Adhesion | 0 | 1 | 0 | 0 | 0 | 0 |
| General Appearance | | | | | | |
| Clarity | clear | clear | clear | clear | clear | sl. haze |
| Gloss | high | high | high | high | high | good |
| Adhesion to Steel | poor | good | poor | good | poor | fair |
| Mar Resistance | good | good | excel | excel | excel | excel |
| Properties on ETA-3081 | | | | | | |
| Crosshatch Adhesion | 5 | 5 | 5 | 4 | 5 | nd |

The results in Table 5 show that excellent resins can be obtained at concentrations of Polymer A of only 20 pbw. Again it was found that 0.4 pbw of CYCAT 600 was needed in the formulations containing CYMEL 1156 to achieve phase stable resins but no CYCAT 600 was needed in the formulations containing CYMEL 1141. All three of the coatings containing CYMEL 1156 had poor adhesion to steel while those containing CYMEL 1141 adhere somewhat better to steel. Formulations 5-1 through 5-5 had excellent adhesion to TPO. Adhesion to TPO was not determined (nd) on Formulation 5-6 but it too is expected to show excellent adhesion to TPO.

Example 3

Effect of Type of Hydroxy Terminated Polydiene Polymer

The results in Table 6 show the effect of the type of hydroxy terminated diene polymer used in the composition containing TMPD diol and CYMEL 1141.

TABLE 6

| Composition, pbw | 6-1 | 6-2 | 6-3 | 6-4 |
|---|---|---|---|---|
| Polymer A | 40 | — | — | — |
| Polymer B | — | 40 | — | — |
| Polymer C | — | — | 40 | — |
| Polymer D | — | — | — | 40 |
| TMPD diol | 20 | 20 | 20 | 20 |
| CYMEL 114T | 40 | 40 | 40 | 40 |
| VM&P naphtha | 67 | 67 | 67 | 67 |
| Cook Time, hr | 2 | 2 | 2 | 2 |
| Cook Temp., ° C. | 100 | 100 | 100 | 100 |
| Appearance of Resin | | | | |
| Phase stable? | yes | yes | yes | yes |
| Clarity | clear | clear | clear | opaque |
| Viscosity @ 25° C., cps | 170 | 95 | 45 | paste |

TABLE 6-continued

| Composition, pbw | 6-1 | 6-2 | 6-3 | 6-4 |
|---|---|---|---|---|
| Properties on QD412 | | | | |
| Thickness, mil | 1.0 | 1.1 | 1.1 | — |
| Pencil Hardness | H | 4 H | H | — |
| MEK Rubs | 100 | >100 | >100 | — |
| Crosshatch Adhesion | 1 | 5 | 4 | — |
| General Appearance | | | | |
| Clarity | clear | clear | clear | — |
| Gloss | high | high | high | — |
| Adhesion to Steel | good | excel | excel | — |
| Mar Resistance | good | excel | excel | — |
| Properties on ETA-3081 | | | | |
| Crosshatch Adhesion | 5 | 3 | 3 | — |

All four formulations were cooked for 2 hours at 100° C. without addition of CYCAT 600 catalyst because CYMEL 1141 was used in all formulations. As is the case with nearly all the resins prepared in this work, all four resins were clear when hot after cooking was complete. Formulations 6-1, 6-2 and 6-3 remained clear when cooled to room temperature. However, Formulation 6-4 became an opaque, easily stirred paste when cooled to room temperature. Thus, in practical applications Formulation 6-4 would have to be coated onto a substrate while it was still hot. Since equipment to do this was not available, Formulation 6-4 was not coated and tested. However, its properties would be expected to be similar to those of Formulation 6-1 based on Polymer A. Results on Formulations 6-1, 6-2, and 6-3 show that, although the compositions with Polymers B and C did not adhere to TPO as well as the composition with Polymer A, all three of Polymers A, B, and C are suitable for use in this invention. Although more sophisticated equipment may be needed to coat resins based on Polymer D, it is expected that Polymer D would also be suitable for use in this invention.

Example 4

Effect of Styrene Content in the Hydroxy Terminated Diene Polymer

The results in Table 7 compare compositions made with hydroxy terminated polydiene polymers with varying styrene content with TMPD diol and the methylated melamine resin, CYMEL 303.

TABLE 7

| Composition, pbw | 7-1 | 7-2 | 7-3 |
|---|---|---|---|
| Polymer A | 40 | — | — |
| Polymer E | — | 40 | — |
| Polymer F | — | — | 40 |
| TMPD diol | 20 | 20 | 20 |
| CYMEL 303 | 40 | 40 | 40 |
| CYCAT 600 | 1 | 1 | 1 |
| VM&P naphtha | 67 | 67 | 67 |
| Cook Time, hr | 3 | 3 | 3 |
| Cook Temp., ° C. | 100 | 100 | 100 |
| Appearance of Resin | | | |
| Phase stable? | no | yes | yes |
| Clarity | v. Hazy | clear | clear |
| Viscosity @ 25° C., cps | nd | 540 | 1300 |
| Properties on QD412 | | | |
| Thickness, mil | — | 1.2 | 1.1 |

TABLE 7-continued

| Composition, pbw | 7-1 | 7-2 | 7-3 |
|---|---|---|---|
| Pencil Hardness | — | 4 B | 3 B |
| MEK Rubs | — | >100 | 15 |
| Crosshatch Adhesion | — | 0 | 0 |
| General Appearance | | | |
| Clarity | — | clear | clear |
| Gloss | — | high | high |
| Adhesion to Steel | — | poor | poor |
| Mar Resistance | — | excel | excel |
| Properties on ETA-3081 | | | |
| Crosshatch Adhesion | — | 5 | 2 |

The results for Formulation 7-1 show that it was difficult to prepare this resin. Even under these fairly severe cooking conditions, the resin was hazy and phase separated upon standing at room temperature. It is felt that a phase stable composition could be made with Formulation 7-1 with further work to optimize catalyst concentration and cooking conditions. The reason for this difficulty in preparing Formulation 7-1 is the limited compatibility of Polymer A with CYMEL 303. Results on Formulations 7-2 and 7-3 show that Polymers E and F gave much better resins in this formulation than did Polymer A. This shows the beneficial effect of including styrene in the diol in improving compatibility with the melamine resin. In this formulation, neither resin gave good adhesion to steel but both adhered fairly well to the TPO.

Example 5

Adhesion of Various Coating Compositions to Primed Steel

A selection of coating compositions based on dihydroxy functional polydiene polymers was tested on steel panels which were primed with the cathodic electrodeposition (CED) epoxy primer specified for use on Ford cars. The resins were also tested on unprimed steel. The compositions of the resins are given in Table 8. All of the resins were prepared by cooking them in a resin kettle for 2 hours at 100° C. at 60% w solids in Shell VM&P Naphtha solvent. All the resins were clear, nearly colorless, fairly low viscosity liquids. They were applied to the substrates with a #52 wire rod and were cured by baking 30 minutes at 121° C. Properties are shown in the Table 8.

TABLE 8

Adhesion of Various Basecoats to Steel[a]

| Composition, pbw[d] | 8-1 | 8-2 | 8-3 | 8-4 | 8-5 | 8-6 |
|---|---|---|---|---|---|---|
| Polymer A | 40 | 30 | 30 | 30 | | |
| Polymer F (43% S) | | | | | 40 | |
| Polymer E (26% S) | | | | | | 40 |
| TMPD Diol | 20 | 20 | | | 20 | 20 |
| HBPA[e] | | | 20 | | | |
| BPA | | | | 20 | | |
| CYMEL 1156 | 40 | 50 | 50 | 50 | | |
| CYMEL 1141 | | | | | 40 | 40 |
| CYCAT 600 | 1 | 1 | 1 | 1 | 1 | 1 |
| VM&P Naphtha | 67 | 67 | 67 | 67 | 67 | 67 |
| Cook Time, hr | 2 | 2 | 2 | 2 | 2 | 2 |
| Cook Temp, C. | 100 | 100 | 100 | 100 | 100 | 100 |
| Properties on Unprimed Steel[b] | | | | | | |
| Thickness, mil | 1.3 | 0.9 | | | 1.1 | 1.2 |
| Pencil Hardness | HB | H | | | 4 H | 4 H |
| Rocker Hardness | | 12 | | | | |
| Crosshatch Adhesion | 0 | 0 | | | 5 | 5 |
| Properties on CED Primed Steel[c] | | | | | | |
| Thickness, mil | 2.0 | 2.1 | 1.9 | 1.9 | 2.0 | 2.1 |
| Pencil Hardness | H | H | H | H | 4 H | 3 H |
| Rocker Hardness | 5 | 11 | 15 | 10 | 6 | 6 |
| Crosshatch Adhesion | 5 | 5 | 5 | 5 | 5 | 5 |

[a]Resins were cooked for 2 hours at 100° C. with 0.4 pbw CYCAT 600 in a resin kettle. CYCAT level was raised to 1 pbw prior to casting films. Coatings were applied onto the substrates with #52 wire rod. They were cured by baking 30 minutes at 121° C.
[b]Unprimed steel substrate was QD412 panels from Q-Panel Corp.
[c]CED primed steel was APR 16900 (Ford spec) from ACT.
[d]pbw = parts by weight
[e]Hydrogenated Bisphenol A The results of the crosshatch adhesion test show that the coating compositions based on the two styrene-containing diols, Polymers E and F, give good crosshatch adhesion to unprimed steel since the acid functional melamine resin, CYMEL 1141, was used in these formulations. The results in Table 8 also show that all of the coating compositions gave excellent crosshatch adhesion to the CED epoxy primed steel. Thus, any of these coating compositions would be a candidate for use in coatings over this epoxy primer. It is likely that the epoxy primer coating has residual functional groups which can react with the melamine resin in the coating composition giving excellent bonding between the primer and the coating composition.

Example 6

Basecoat/Clearcoat Combinations

A system for painting a car would consist of at least three layers (primer/basecoat/clearcoat) or four layers (primer/surfacer/basecoat/clearcoat). Table 9 presents prototype formulations for a basecoat and three clearcoats intended to demonstrate the suitability of resins based on Polymer A for use in automotive coatings.

TABLE 9

Basecoat/Clearcoat Combinations

| Coating Composition, pbw | White Basecoat 9-1 | Cooked Clearcoat 9-2 | Polyester Clearcoat 9-3 | Acrylic Clearcoat 9-4 |
|---|---|---|---|---|
| Polymer A | 40 | 30 | | |
| DESMOPHEN 670A-80 | | | 87.5 | |
| DESMOPHEN 365 | | | | 607 |
| TMPD Diol | 20 | | | |
| BEPD Diol | | 20 | | |
| CYMEL 1156 | 40 | 50 | | |
| CYMEL 303 | | | 30 | |
| DESMODUR BL-3175 | | | | 370 |
| CYCAT 600 | 1 | 1 | 1 | |
| DABCO T-12 | | | | 0.73 |
| IRGANOX 1076 | 0.5 | 0.5 | 0.5 | 3.6 |
| TINUVIN 328 | 1 | 2 | 2 | 14.6 |
| TINUVIN 123 | 2 | 2 | 1 | 7.3 |
| VM&P Naphtha HT | 67 | 67 | | |
| Xylene | | | 28 | 253 |
| TiPure R-706 | 100 | | | |

The resins in Basecoat 9-1 and Clearcoat 9-2 were cooked for 2 hours at 100° C. with 0.4 pbw of CYCAT 600. Before casting films, the catalyst level was increased to 1 pbw and the stabilizers (IRGANOX 1076, TINUVIN 328, and TINUVIN 123, supplied by Ciba Geigy) were added. Basecoat 9-1 used $TiO_2$ at 50% w on a solids basis as the pigment. Clearcoat 9-3 was a polyester polyol cured with a melamine resin and Clearcoat 9-4 was an acrylic polyol cured with a blocked isocyanate. All coatings were thinned as required to achieve a sprayable viscosity using xylene/butanol (1/1).

The white Basecoat 9-1 was applied to three substrates; DEXFLEX 880 (purchased from Standard Plaque, Inc.) is a TPO which is typical of the type used in automobile bumpers, epoxy primed steel (APR 16900 purchased from Advanced Coating Technologies, Inc.) which is the CED epoxy primer specified for use by Ford, and primer/surfacer coated steel (APR 29401 purchased from Advanced Coating Technologies, Inc.) which is specified for use by Ford. After about a 5 minute flash, Clearcoat 9-2 was applied over the coated epoxy primed steel, and the coatings were cured by baking 30 minutes at 121° C. The white Basecoat 9-1 on TPO was cured by baking 30 minutes at 121° C. and Clearcoat 9-3 was applied and cured by baking 30 minutes at 121° C. The white Basecoat 9-1 on the primer/surfacer coated steel was cured by baking 30 minutes at 121° C. Clearcoat 94 was applied over the coated primer/surfacer panels and the clearcoat was cured by baking for 20 minutes at 150° C. It was found that all three basecoat/clearcoat systems gave excellent adhesion in the crosshatch adhesion test.

These results demonstrate that basecoat compositions based on the dihydroxy polydiene polymers are suitable candidates for use in coatings not only for TPO but also for the primed metal parts of the car as well. They have excellent crosshatch adhesion to TPO and to the primed metal substrates which are typically used by Ford. They also have excellent intercoat adhesion with polyester/melamine and acrylic/urethane clearcoats as well as to clearcoats made from another dihydroxy polydiene resin.

I claim:

1. A process for making a compatible crosslinked composition which comprises the steps of:

(a) mixing together from 10 to 80 percent by weight of a hydroxy functional polydiene polymer having a functionality of at least 1.3, from 8 to 60 percent by weight of an amino resin crosslinking agent, and from 2 to 40 percent by weight of a reinforcing agent which has at least two functional groups which will react with the amino resin crosslinking agent, said functional groups selected from the group consisting of hydroxyl, carboxylic acid or anhydride, or amide functionality, wherein the reinforcing agent has an equivalent weight from 30 to 150 grams per functional group, and (b) partially reacting the polydiene polymer, amino resin, and reinforcing agent at 60 to 120° C. for 0.5 to 10 hours, optionally in the presence of a small amount of crosslinking catalyst, such that a phase-stable mixture is obtained, (c) applying the partially reacted mixture to a substrate, and (d) crosslinking the applied mixture by baking at 100 to 250° C. for 0.01 to 2 hours, optionally in the presence of additional crosslinking catalyst.

2. The process of claim 1 wherein a crosslinking catalyst is used in a total amount of from 0.05 to 4% by weight and less than one half is used in step (b).

3. The process of claim 2 wherein the total amount of catalyst used is from 0.1 to 2% by weight.

4. The product of the process of claim 1.

* * * * *